J. H. Rauch,
Drag Saw.
No. 39,749. Patented Sep. 1, 1863.

Witnesses:

Inventor:

UNITED STATES PATENT OFFICE.

J. H. RAUCH, OF IDA, MICHIGAN.

IMPROVED CROSSCUT-SAWING MACHINE.

Specification forming part of Letters Patent No. 39,749, dated September 1, 1863.

*To all whom it may concern:*

Be it known that I, J. H. RAUCH, of Ida, in the county of Monroe and State of Michigan, have invented a new and Improved Crosscut-Sawing Machine; and I do hereby declare that the following is a full, clear, and exact description of the same, reference being had to the accompanying drawings, making a part of this specification, in which—

Figure 1:
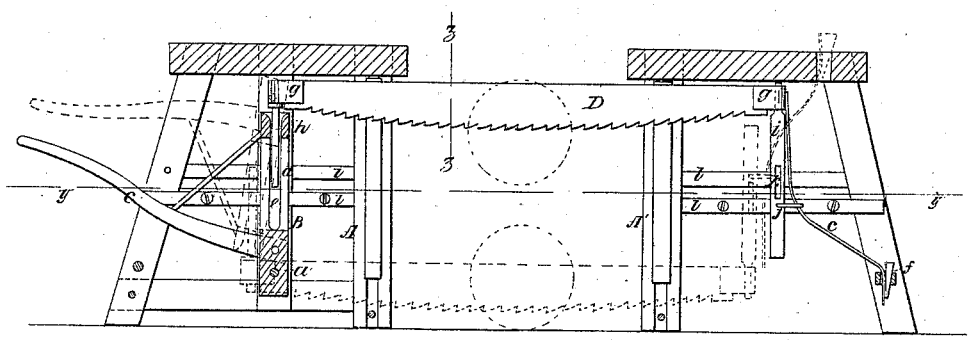
Figure 3:
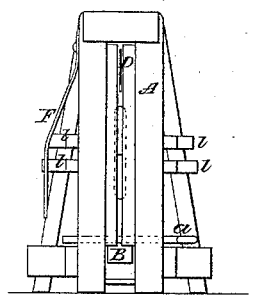
Figure 2:
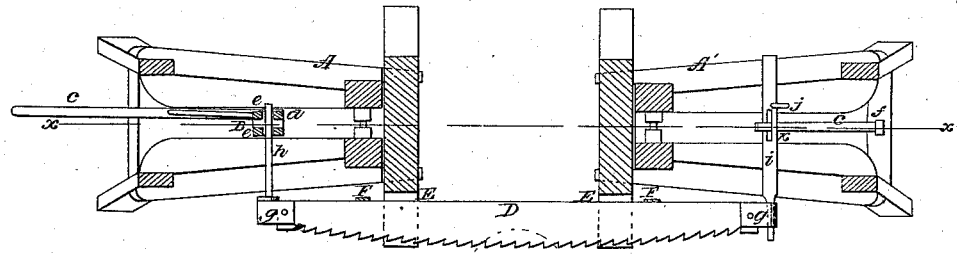

Figure 1 is a side sectional view of my invention, taken in the line $x\ x$, Fig. 2; Fig. 2, a horizontal section of the same, taken in the line $y\ y$, Fig. 1; Fig. 3, a transverse vertical section of the same, taken in the line $z\ z$, Fig. 1.

Similar letters of reference indicate corresponding parts in the several figures.

This invention relates to a new and improved crosscut-sawing machine for sawing logs into fire-wood, and also for sawing down standing trees.

The invention consists in a novel arrangement of a saw with a lever, springs, and a framing, as hereinafter fully shown and described, whereby the saw may be readily applied to its work and operated by a single individual.

To enable those skilled in the art to fully understand and construct my invention, I will proceed to describe it.

A A′ represent two frames, which may be constructed of wood in a substantial and durable manner. In the frame A there is fitted what may be termed a "bent lever," B, the fulcrum-pin $a$ of which passes through any of a series of holes made in uprights at opposite sides of the frame A. The part $c$ of the lever B is the handle, and the part $d$ is tubular and has longitudinal slots $e$ made in it nearly its whole length. (See Fig. 1.) The frame A′ has a spring, C, fitted in it. This spring is secured in the frame A′ by means of a key or wedge, $f$, and it may be secured to either the lower or upper part of A′, as will be seen by referring to Fig. 1, in which the spring is shown attached to the lower part of A′ in black and to the upper part in red.

The saw, which is designated by D, is provided with a socket, $g$, at each end, into one of which a cylindrical rod, $h$, is fitted, and into the other the shank or tang of a flat bar, $i$, which has a ring, $j$, attached to it, through which the spring C passes, as shown in Fig. 1.

When the device is to be applied to a rather elevated log, the rod $h$ is inserted in its socket $g$, so as to depend from the saw, and likewise the bar $i$, as shown in black in Fig. 1, the spring C being attached to the lower part of the frame A. The saw D rests upon the log, and is operated by oscillating the lever B, a reciprocating motion being thereby imparted to the saw, which feeds itself to its work by its own gravity. The spring C yields or gives under the action of the lever B. When the log is partly cut through, or when a log has rather a low elevation, the rod $h$ and bar $i$ are reversed in position, and also the lever B, as shown in red in Fig. 1. The spring C is also reversed, as shown in red.

In sawing down a standing tree, the saw D is placed in a horizontal position, and at the outer sides of the frames A A′, as shown in Fig. 2. In this arrangement the rod $h$ passes transversely through the slots $e$ of the part $d$ of the lever B, and the spring C passes through a slot, $k$, in the bar $i$. The saw also rests in guides E E, which project horizontally, one from each frame A A′, and are fitted between cleats $l$, attached to the sides of the frames. To each frame, at one side, there is attached a spring, F, and these springs bear against the back edge of the saw and feed the lathe in its work.

The arrangement is extremely simple and efficient, and may be applied to its work and operated with the greatest facility by a single workman.

Having thus described my invention, what I claim as new, and desire to secure by Letters Patent, is—

The two frames A A′, one, A, provided with a bent lever, B, having its inner part of tubular form, and slotted longitudinally, and the other one, A′, provided with an adjustable spring, C, and each frame provided with a spring, F, and guides, E E, in combination with the saw D, provided at its ends with a reversible rod, $h$, and bar $i$, all arranged for joint operation as and for the purpose specified.

J. H. RAUCH.

Witnesses:
HENRY HONBERGER,
HENRY H. RAUCH.